(12) United States Patent
Sayeed et al.

(10) Patent No.: US 7,881,671 B2
(45) Date of Patent: Feb. 1, 2011

(54) METHOD AND SYSTEM FOR RETRIEVING INFORMATION FROM WIRELESS SENSOR NODES

(75) Inventors: Akbar M. Sayeed, Madison, WI (US); Thiagarajan Sivanadyan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1317 days.

(21) Appl. No.: 11/406,070

(22) Filed: Apr. 18, 2006

(65) Prior Publication Data

US 2007/0243827 A1    Oct. 18, 2007

(51) Int. Cl.
  *H04B 17/00*    (2006.01)
(52) U.S. Cl. ............... 455/67.11; 455/41.2; 455/456.1; 455/404.2; 342/22; 342/89; 342/90; 342/134; 342/165; 342/173; 342/175; 342/192; 342/195; 342/387; 340/539.22; 340/10.41; 370/229; 370/328; 370/338; 370/339; 375/214
(58) Field of Classification Search .............. 455/67.11, 455/41.2, 456.1, 404.2; 342/22, 89, 90, 134, 342/165, 173, 175, 192, 195, 387; 340/539.22, 340/10.41; 370/229, 328, 338, 339; 375/214
See application file for complete search history.

(56) References Cited

U.S. PATENT DOCUMENTS 6,845,240 B2 *   1/2005   Carlson et al. ............ 455/456.1
6,864,826 B1 *   3/2005   Stove ........................... 342/22
7,289,466 B2 *   10/2007  Kore et al. ................... 370/328
7,433,648 B2 *   10/2008  Bridgelall ................... 455/41.2
7,603,129 B2 *   10/2009  Gonia et al. ............. 455/456.1

OTHER PUBLICATIONS

Examiner's First Report received in EP 2007237986, Jul. 20, 2010.
Ananthasubramaniam et. al., "On Localization Performance in Imaging Sensor Nets," Submitted to IEEE Transactions on Signal Processing (Nov. 2005).
Ananthasubramaniam et. al., "Detection and Localization of Events in Imaging Sensor Nets," Proc. 2005 IEEE International Symposium on Information Theory (ISIT 2005), Adelaide, Australia, Sep. 2005.

(Continued)

*Primary Examiner*—Matthew D Anderson
*Assistant Examiner*—April G Gonzales
(74) *Attorney, Agent, or Firm*—Bell & Manning, LLC (57) ABSTRACT

A system supporting data retrieval from a plurality of wireless sensor nodes is defined. The system includes the plurality of wireless sensor nodes and a data retrieval device. The plurality of wireless sensor nodes include a transceiver receiving a first signal and transmitting a second signal. The second signal includes a sensed datum or an encoded statistic based on the sensed datum identified at the plurality of wireless sensor nodes. The data retrieval device includes a plurality of antennas transmitting the first signal toward the plurality of wireless sensor nodes and receiving the second signal from the plurality of wireless sensor nodes, and a processor coupled to receive the received second signal from the plurality of antennas, the processor defining a virtual receive signal from the received second signal for the plurality of antennas and processing the defined virtual receive signal to determine the identified sensed datum.

26 Claims, 7 Drawing Sheets

OTHER PUBLICATIONS

Ananthasubramaniam et. al., "Virtual Radar Approach to Event Localization in Sensor Networks," Proc. 2004 IEEE International Symposium on Information Theory (ISIT 2004), Chicago, IL, Jun. 27-Jul. 2, 2004.

Ananthasubramaniam et. al., "Virtual Radar Imaging for Sensor Networks," Proc. 3$^{rd}$ International Symposium on Information Processing in Sensor Networks (IPSN'04), Berkeley, California, USA, Apr. 2004.

Bajwa et. al., "Matched source-Channel Communication for Field Estimation in Wireless Sensor Networks," IPSN'05, Apr. 2005.

Sayeed, "A Virtual Representation for Time- and Frequency-selective Correlated MIMO Channels," ICASSP 2003, vol. 4, pp. 648-651.

Sayeed, "Deconstructing Multi-antenna Fading Channels," IEEE Transactions on Signal Processing (special issue on MIMO Systems), pp. 2563-2579, Oct. 2002.

International Search Report and Written Opinion for PCT/US2007/066708 dated Sep. 15, 2008.

* cited by examiner

METHOD AND SYSTEM FOR RETRIEVING INFORMATION FROM WIRELESS SENSOR NODES

REFERENCE TO GOVERNMENT RIGHTS

This invention was made with U.S. government support awarded by the following agencies: NSF 0431088. The U.S. government has certain rights in this invention.

FIELD OF THE INVENTION

The subject of the disclosure relates generally to wireless sensor networking. More specifically, the disclosure relates to a method and a system of retrieving information from a network or ensemble of wireless sensor nodes.

BACKGROUND OF THE INVENTION

Wireless sensor networking is an emerging technology that promises an unprecedented ability to monitor the physical environment using a network of relatively inexpensive sensor nodes that can sense the physical environment in a variety of modalities including temperature, pressure, chemical concentration, motion, etc. Sensor networks may consist of a large number of sensor nodes with communication, sensing, and computation capabilities. Because the wireless sensor nodes are typically battery powered, the sensor nodes may be severely constrained relative to their energy supply. Existing approaches to data collection and information extraction from the wireless sensor nodes rely on in-network processing that requires information routing and coordination between sensor nodes. Multiple hops between sensor nodes may be required to reach a remote destination where the data is to be processed. Thus, in-network processing of collected data from the wireless sensor nodes typically requires significantly more energy than the sensing or computation processing. Additionally, each sensor node may require additional computational capability in order to form an ad-hoc network. As a result, there is a delay associated with receipt of the information as it propagates through the network from node-to-node and potentially additional energy consumption requirements as sensor nodes propagate the information sensed by other sensor nodes.

The location of the phenomena being sensed may be critical to many sensor network applications as well. As a result, the data transmitted between sensor nodes in typical sensor networks includes the location of the originating sensor node. The absolute location of the sensor node may not be known, however, necessitating use of a positioning technology such as inclusion of a global positioning system (GPS) receiver at each sensor node. GPS receivers are vulnerable to jamming and to attenuation. Additionally, the inclusion of a GPS receiver at each sensor node increases the cost of each sensor node. Thus, what is needed is a system that supports information retrieval from the sensor nodes in a more cost effective manner. What is additionally needed is a system that supports receipt of the sensed data with reduced latency and with improved energy efficiency.

SUMMARY OF THE INVENTION

An exemplary embodiment provides a system and a method for supporting data retrieval from a plurality of sensor nodes-with improved energy efficiency, reduced latency, and reduced cost. The system utilizes an data retrieval device that queries a plurality of sensor nodes to obtain the sensed data in a rapid and energy-efficient manner. The sensor nodes require only limited computational capability. In an exemplary embodiment, the data retrieval device includes the necessary computational capability and an antenna array for receiving signals from the plurality of sensor nodes. The data retrieval device transmits a wideband signal in the direction of the plurality of sensor nodes. In response, the plurality of sensor nodes send a signal in the direction of the data retrieval device that includes the sensed data. The plurality of sensor nodes act as active scatterers producing a multipath response to the wideband signal transmitted from the data retrieval device. The multipath signals received at the data retrieval device include the sensed data transmitted from the plurality of sensor nodes. The multipath signals may be resolved spatially in angle and/or in range and based on Doppler frequency, if the sensor nodes and/or the data retrieval device are moving. The transmitted signals from the sensor nodes also may be encoded to further enable distinguishing the return signal from different sensor nodes.

The system includes, but is not limited to, a plurality of wireless sensor nodes and a data retrieval device. The plurality of wireless sensor nodes include a transceiver receiving a first signal and transmitting a second signal. The second signal includes a sensed datum identified at the plurality of wireless sensor nodes. The data retrieval device includes a plurality of antennas transmitting the first signal toward the plurality of wireless sensor nodes and receiving the second signal from the plurality of wireless sensor nodes, and a processor coupled to receive the received second signal from the plurality of antennas, the processor defining a virtual receive signal from the received second signal for the plurality of antennas and processing the defined virtual receive signal to determine the identified sensed datum.

Another exemplary embodiment of the invention comprises a method of retrieving data from a plurality of wireless sensor nodes. The method includes, but is not limited to, transmitting a first signal from a plurality of antennas toward a plurality of wireless sensor nodes, receiving a second signal from the plurality of wireless sensor nodes at the plurality of antennas, defining a virtual receive signal from the received second signal for the plurality of antennas, and processing the defined virtual receive signal to determine a sensed datum. The sensed datum is identified at the plurality of wireless sensor nodes and the second signal includes the sensed datum.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION OF THE EXEMPLARY EMBODIMENTS

Figure 1:
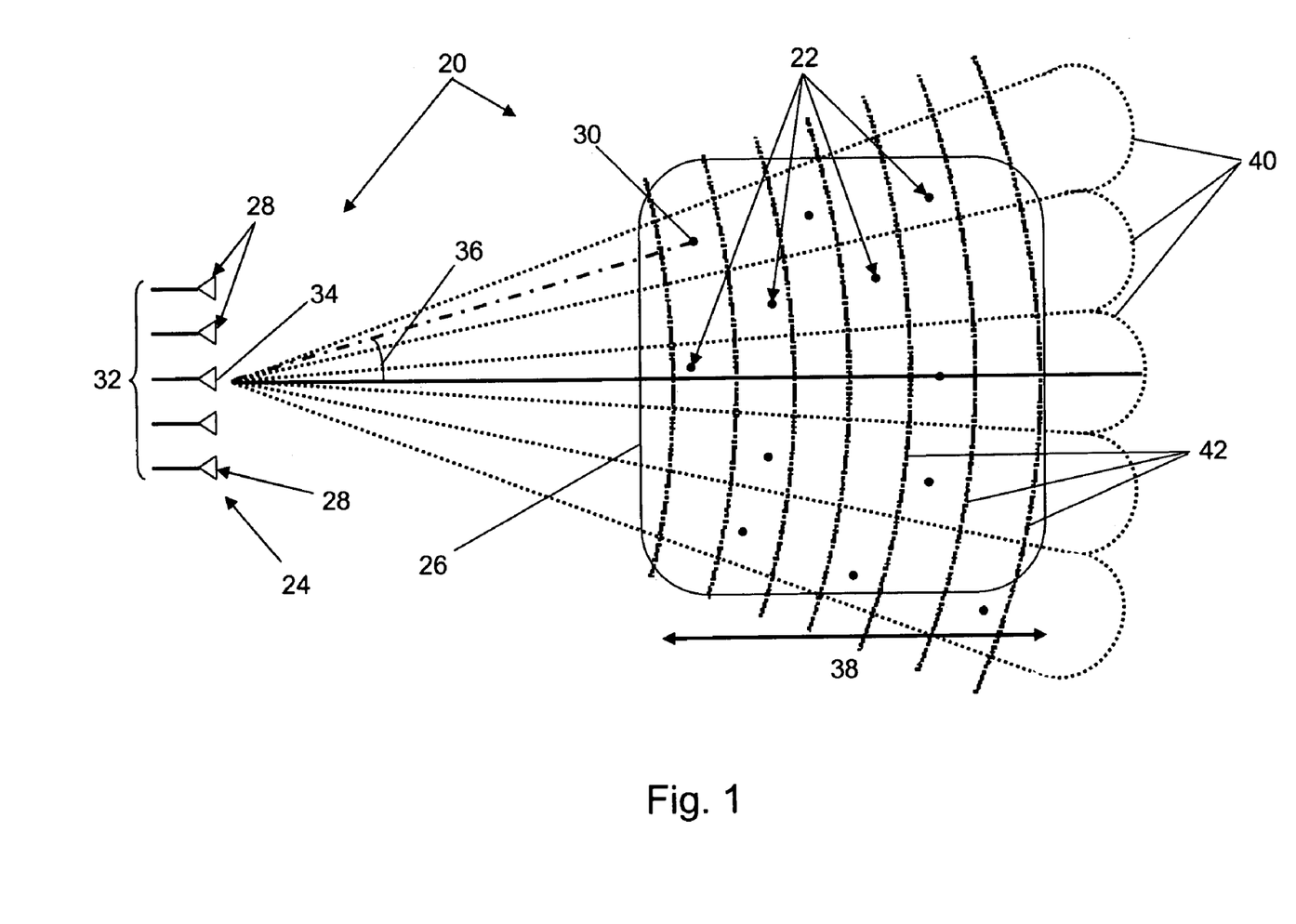
FIG. 1 depicts a data retrieval system in accordance with an exemplary embodiment.

With reference to FIG. 1, a data retrieval system 20 is shown. Data retrieval system 20 includes a plurality of sensor nodes 22 and a data retrieval device 24. The plurality of sensor nodes 22 may be distributed over a region 26 randomly, uniformly, non-uniformly, etc. depending at least partially on the sensing requirements of data retrieval system 20. The exemplary embodiment of FIG. 1. shows a non-uniform distribution of the plurality of sensor nodes 22. In the exemplary embodiment of FIG. 1, data retrieval device 24 includes a plurality of antenna elements 28 arranged in a uniform linear array 32. The plurality of antenna elements 28 may be arranged to form a uniform or non-uniform linear array, a rectangular array, a circular array, a conformal array, etc. The problem of detecting and localizing scattering objects using pulsed signals and antenna arrays is similar to that encountered in radar systems, such as those used for air traffic control, military surveillance, imaging of targets, etc. Data retrieval device 24 is located sufficiently far from region 26 such that far-field assumptions apply. Region 26 can be spatially divided into a plurality of spatial beams 40 and a plurality of time delay rings 42 based on the spatio-temporal resolution supported by data retrieval device 24.

In an exemplary embodiment, data retrieval device 24 transmits a wideband (spread-spectrum) signaling waveforms, $s_m(t)$, from the plurality of antenna elements 28. Each signaling waveform is of duration T and two-sided bandwidth W. N=TW>>1 denotes the time-bandwidth product of the temporal signaling waveforms from each antenna element and represents the approximate dimension of the temporal signal space. Thus, the signal space of spatio-temporal interrogation waveforms transmitted by the plurality of antennas has dimension MN=MTW, where M is the number of antennas of the plurality of antenna elements 28.

Figure 2:
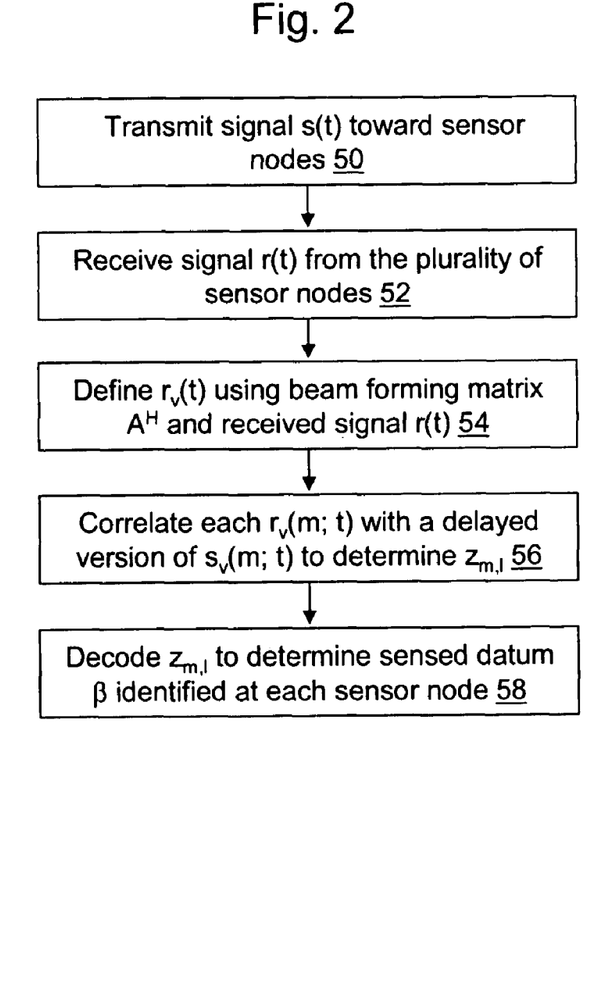
FIG. 2 is a flow diagram illustrating exemplary operations performed at a data retrieval device in accordance with an exemplary embodiment.
Figure 3:
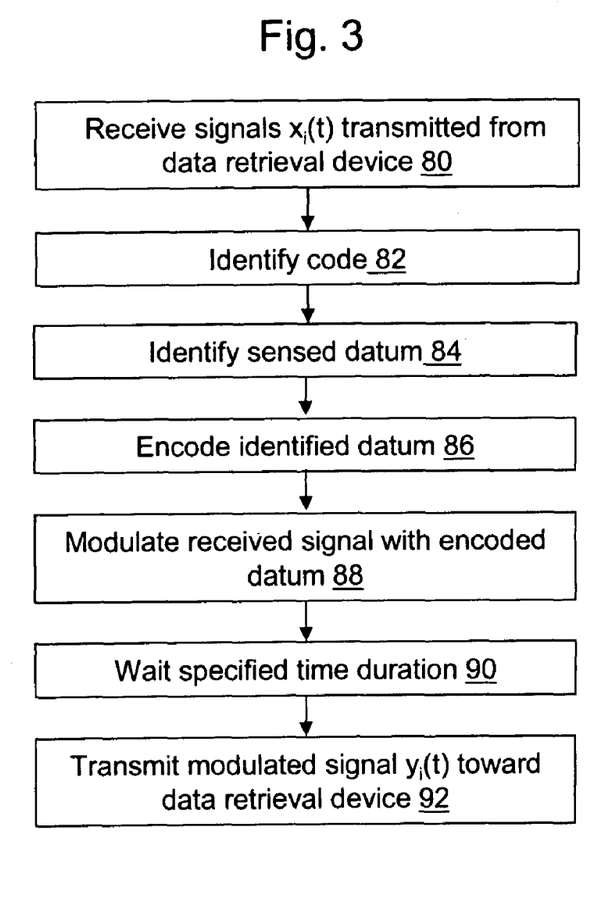
FIG. 3 is a flow diagram illustrating exemplary operations performed at a sensor node in accordance with an exemplary embodiment.

In an exemplary embodiment, data retrieval device 24 and the plurality of sensor nodes 22 are carrier frequency synchronized, but not phase synchronized, and the phase offset between the plurality of sensor nodes 22 and data retrieval device 24 stays relatively constant during the signal duration T. With reference to FIG. 2, exemplary operations performed at data retrieval device 24 are described. With reference to FIG. 3, exemplary operations performed at an exemplary sensor node 30 of the plurality of sensor nodes 22 are described. Data retrieval device 24 transmits a space-time signal $s(t)=[s_0(t), s_1(t), \ldots, s_{M-1}(t)]^T$ in an interrogation packet to initiate data retrieval from the plurality of sensor nodes 22 in an operation 50. The $i^{th}$ sensor node receives a superposition of the transmitted space-time signals, in an operation 80, $$x_i(t) = \sum_{\mu=0}^{M-1} s_\mu(t - \tau_{i,\mu}) e^{-j\phi_{i,\mu}}, \quad (1)$$

where $\tau_{i,\mu}$ is the relative time-delay between the $i^{th}$ sensor node of the plurality of sensor nodes 22 and $\mu^{th}$ antenna of the plurality of antenna elements 28 and $\phi_{i,\mu}$ is the resulting relative phase offset. $\tau_{i,\mu}$ is fixed with respect to an antenna 34 in the middle of linear array 32. The noise is assumed to be negligible because the space-time signal is transmitted with sufficient power or is repeated a sufficient number of times to reduce the noise to a negligible amount.

In the far-field, and under appropriate choice of W such that $\max_\mu \tau_{i,\mu} - \min_\mu \tau_{i,\mu} <<1/W$ for all i, the differences in the relative time delays between a sensor node of the plurality of sensor nodes 22 and a different antenna of the plurality of antenna elements 28 can be neglected in the signaling waveform. Thus, $s_\mu(t-\tau_{i,\mu}) \approx s_\mu(t-\tau_i)$, for all $\mu$, where $\tau_i$ denotes the common delay from the $i^{th}$ sensor node to all antennas in the plurality of antenna elements 28. The relative phase offsets $\phi_{i,\mu}$ in $x_i(t)$ include a common, random component $\phi_i$ and a deterministic component that is captured by a steering response vector of linear array 32. In an exemplary embodiment, a one-dimensional uniform linear array having an odd number of antennas separated by a spacing d between antenna elements of linear array 32 is used. The steering response vector for linear array 32 is given by $$a(\theta) = [e^{j2\pi\tilde{M}\theta}, \ldots, 1, \ldots, e^{-j2\pi\tilde{M}\theta}]^T, \quad (2)$$

where $\tilde{M}=(M-1)/2$, and the normalized angle $\theta$ is related to the physical angle of arrival/departure $\phi$ as $\theta=d \sin((\phi)/\lambda$, where $\lambda$ is the wavelength of propagation. The steering response vector of equation (2) represents the relative phases across the plurality of antenna elements 28 for transmitting/receiving a beam in the direction $\theta$. Thus, $x_i(t)$ can be compactly expressed as $$x_i(t) = e^{-j\phi_i} a^T(\theta_i) s(t-\tau_i), \quad (3)$$

where $\theta_i$ denotes the direction of the $i^{th}$ sensor node relative to data retrieval device 24. As an example, a physical angle of arrival/departure 36 to sensor node 30 is indicated in FIG. 1. In the exemplary embodiment, $d=\lambda/2$ spacing, which corresponds to the plurality of sensor nodes 22 projecting a maximum angular coverage spread of 180 degrees from data retrieval device 24. A larger spacing d between antennas of the plurality of antenna elements 28 can be used with a resulting smaller angular coverage spread as known to those skilled in the art.

In an operation 82, the $i^{th}$ sensor node identifies a code included with the received signal. In an operation 84, the $i^{th}$ sensor node identifies a sensed datum using a sensing capability at the $i^{th}$ sensor node. The sensor nodes can sense the physical environment in a variety of modalities including temperature, pressure, chemical concentration, motion, etc. In an operation 86, the $i^{th}$ sensor node encodes the identified datum in a parameter $\beta_i$ using the identified code. The identified datum may be an instantaneous value of the sensor at the node, or may be a sequence of sensor values measured at the sensor node over a period of time, depending on the rate of temporal variation in the signal field. The encoding of the identified datum may be done in a variety of ways, known to those skilled in the art, to compress the information in the identified datum. In an operation 88, the $i^{th}$ sensor node modulates $x_i(t)$ by $\beta_i$, representing amplitude modulation in an exemplary embodiment. Other modulation and coding (across multiple repeated transmissions of $x_i(t)$) methods may also be used as known to those skilled in the art. In an exemplary embodiment, the $i^{th}$ sensor node, in an operation 90, waits a specified time duration after receiving the transmitted space-time signals. The specified time duration may be the same for all of the plurality of sensor nodes 22. In an operation 92, the $i^{th}$ sensor node transmits the modulated signal with energy $\epsilon$. In an exemplary embodiment, the specified time duration is zero so that transmission of the modulated signal is instantaneous from each sensor node, and the transmitted signal from the $i^{th}$ sensor node can be expressed as $$y_i(t) = \beta_i \sqrt{\frac{\varepsilon}{M}}, \qquad (4)$$

$$x_i(t) = \beta_i \sqrt{\frac{\varepsilon}{M}} e^{-j\varphi_i} a^T(\theta_i) s(t - \tau_i),$$

where $|\beta_i| \leq 1$ and $\int E[|x_i(t)|^2]dt = M$ so that $y_i(t)$ has energy $\epsilon$.

In an operation 52, data retrieval device 24 receives a vector signal $r(t)=[r_0(t), r_1(t), \ldots, r_{M-1}(t)]^T$, which is a superposition of all sensor transmissions and, by the principle of reciprocity, can be expressed as $$r(t) = \sqrt{\frac{\varepsilon}{M}} \sum_{i=1}^{K} \beta_i e^{-j\varphi_i} a(\theta_i) a^T(\theta_i) s(t - \tilde{\tau}_i) + w(t), \qquad (5)$$

where $\tilde{\tau}_i = 2\tau_i$ denotes the round-trip relative delay in the response from the $i^{th}$ sensor node; $w(t)$ denotes an additive white Gaussian noise (AWGN) vector process that represents the noise at the plurality of antenna elements 28; and the random phase $\phi_i$. Let $\tau_{max} = \max_i \tau_i$ and assume that $\min_i \tau_i = 0$ without loss of generality (WLOG). Using equation (5), the effective system equation relating the received vector signal at the plurality of antenna elements 28 to the transmitted space-time signal $s(t)$ can be expressed as $$r(t) = \sqrt{\frac{\varepsilon}{M}} \int_0^{2\tau_{max}} H(t') s(t - t') dt' + w(t) \qquad (6)$$

$$H(t) = \sum_{i=1}^{K} \alpha_i \delta(t - \tau_i) a(\theta_i) a^T(\theta_i), \qquad (7)$$

where $\alpha_i = \beta_i e^{-j\Phi_i}$ and the M×M matrix $H(t)$ represents the impulse response for the space-time multipath channel. The delay spread (spread of the relative delays in the transmissions from the plurality of sensor nodes 22) of the channel is $2\tau_{max}$ illustrated by 38 in FIG. 1. The packet signaling duration T is assumed to be $\gg 2\tau_{max}$. The resulting system representation shown in equation (6) is independent of the power used for transmitting the space-time signal $s(t)$ even though it relates the signal $s(t)$ to the received signal $r(t)$ at the data retrieval device 24 because, after receiving the transmitted space-time signals, each sensor node 32 retransmits the signal with energy $\epsilon$, and the factor $\sqrt{\epsilon}/\sqrt{M}$ reflects this normalization.

The active sensing channel matrix of equation (7) has the same form as the impulse response of a physical multiple input, multiple output (MIMO) multipath wireless channel encountered in wireless transmission and reception with devices having a plurality of antenna elements. The sensor data and phases in $\alpha_i$ in the sensing channel correspond to the complex path gains associated with scattering paths in a MIMO multipath wireless channel. Multiple antenna arrays are used for transmitting data in wireless communication systems. For example, multiple antennas may be used at both the transmitter and at the receiver. Unfortunately, the relatively high dimensional nature of multiple antenna array systems results in a high computational complexity in practical systems. For a discussion of a method for modeling a scattering environment in a multiple antenna wireless communication system that has multiple transmitter elements and multiple receiver elements and a scattering environment with scattering objects located between the transmitter and receiver elements, see U.S. patent application Ser. No. 10/652, 373, entitled a "METHOD AND SYSTEM FOR MODELING A WIRELESS COMMUNICATION CHANNEL," filed Aug. 29, 2003.

The method includes applying fixed virtual signal characteristics to the scattering environment, and generating a channel matrix that couples the transmitter and receiver elements based upon the applied fixed virtual signal characteristics resulting in a unitarily equivalent representation of the physical sensing/multipath channel matrix. A key property of the virtual channel representation is that its coefficients represent a resolution of multipath/sensors in angle, in delay, and in Doppler, where there is relative motion between the data retrieval device 24 and each sensor node commensurate with the signal space parameters M, W, and T, respectively. The virtual representation in angle corresponds to beamforming in M fixed virtual directions: $\tilde{\theta}_m = m/M$, $m = -\tilde{M}, \ldots, \tilde{M}$. The M×M unitary, discrete Fourier transform matrix can be defined as $$A = \frac{1}{\sqrt{M}}[a(-\tilde{M}/M), \ldots, 1, \ldots, a(-\tilde{M}/M)] \qquad (8)$$

whose columns are the normalized steering vectors for the virtual angles and which form an orthonormal basis for the spatial signal space. The virtual spatial matrix $H_v(t)$ is unitarily equivalent to $H(t)$ as $$H(t) = A H_v(t) A^T \Leftrightarrow H_v(t) = A^H H(t) A^* \qquad (9)$$

and the virtual coefficients, representing the coupling between the $m^{th}$ transmit beam and $m'^{th}$ receive beam are given by $$H_V(m', m; t) = a^H(m'/M) H(t) a^*(m/M)/M$$

$$= M \sum_{i=1}^{K} \alpha_i g\left(\theta_i - \frac{m'}{M}\right) g\left(\theta_i - \frac{m}{M}\right) \qquad (10)$$

$$\delta(t - \tilde{\tau}_i) \qquad (11)$$

$$\approx H_V(m, m; t) \delta_{m-m'} \qquad (12)$$

$$H_V(m, m; t) \approx M \sum_{i \in S_{\theta,m}} \alpha_i g^2\left(\theta_i - \frac{m}{M}\right) \delta(t - \tilde{\tau}_i), \qquad (13)$$

where $$g(\theta) = \frac{\sin(\pi M \theta)}{M \sin(\pi \theta)}$$

is the Dirichlet sinc function that captures the interaction between the fixed virtual beams and the true sensor directions; $\delta_m$ denotes the kronecker delta function; and $S_{\theta,m} = \{i \in \{1 \ldots, K\} : -\frac{1}{2}M < \theta_i - m/M \leq \frac{1}{2}M\}$ denotes the set of all sensor nodes whose angles lie in the $m^{th}$ spatial resolution bin of width $\Delta\theta = 1/M$, centered around the $m^{th}$ beam. The last approximation of equation (13) follows from the virtual path partitioning due to beamforming in the virtual representation. Thus, the virtual spatial representation partitions the sensors in angle and is approximately diagonal such that the $m^{th}$ diagonal entry contains the superposition of all sensor node responses that lie within the $m^{th}$ beam of width 1/M. While the use of spatial basis functions corresponding to beams in fixed virtual directions are emphasized in the current exemplary embodiment, other spatial basis functions that form a complete basis for the spatial signal space may also be used.

The sensor responses within each spatial beam of the plurality of spatial beams 40 can be further partitioned by resolving their delays with resolution $\Delta\tau = 1/W$. Various transmission methods, e.g. spread spectrum, are capable of resolving the sensor responses with resolution $\Delta\tau = 1/W$, as known to those skilled in the art. Let $L = \lceil 2\tau_{max} W \rceil$ be the largest normalized delay spread. The diagonal entries of the virtual spatial matrix can be further decomposed into virtual, uniformly spaced delays as $$H_V(m, m; t) \approx M \sum_{\ell=0}^{L} H_V(m, m, \ell)\delta(t - \ell/W) \quad (14)$$

$$H_V(m, m, \ell) = M \sum_{i=1}^{K} \alpha_i g^2\left(\theta_i - \frac{m}{M}\right)\text{sinc}(W\tilde{\tau}_i - \ell) \quad (15)$$

$$\approx M \sum_{i \in S_0, m \cap S_{\tau,\ell}} \alpha_i g^2\left(\theta_i - \frac{m}{M}\right)\text{sinc}(W\tilde{\tau}_i - \ell), \quad (16)$$

where $\text{sinc}(x) = \sin(\pi x)/\pi x$ captures the interaction between the fixed virtual and true sensor node delays, and $S_{\tau,\ell} = \{i : -\frac{1}{2}W < \tilde{\tau}_i - \ell \leq \frac{1}{2}W\}$ is the set of all sensor nodes whose relative delays lie within an $l^{th}$ delay resolution bin of the plurality of time delay rings 42. Thus, the angle-delay virtual representation partitions the sensor node responses into distinct angle and time delay resolution bins. The virtual coefficient $H_v(m,m,\ell)$ is a superposition of all sensor node responses whose angles and time delays lie in the intersection of the $m^{th}$ spatial beam and the $l^{th}$ delay resolution bin. For a given number of antennas M and for a given minimum spacing between sensor nodes, the bandwidth W can be chosen sufficiently large, in principle, so that there is only one sensor in each angle-delay resolution bin. In this case, a one-to-one mapping between i(m, l) and (m(i), l(i)) can be defined to associate each sensor node with a unique angle-delay resolution bin. From equation (16), data retrieval from the $i^{th}$ sensor node amounts to estimating the corresponding virtual angle-delay coefficient $$h_v(m,l) = H_v(m,m,l) \approx M\beta_{i(m,l)}\gamma_{i(m,l)}$$

$$\gamma_{i(m,l)} = e^{-j\phi_i} g^2(\theta_i - m/M)\text{sinc}(W\tilde{\tau}_i - l)|_{i = i(m,l)}. \quad (17)$$

In an operation 54, a virtual receive signal $r_v(t)$ is defined from a beamforming matrix $A^H$ and the received signal r(t) for each antenna of the plurality of antenna elements 28 as $s(t) = As_v(t)$ and $r_v(t) = A^H r(t)$ where $s_v(t)$ and $r_v(t)$ are the M-dimensional transmitted and received signals in the virtual spatial domain (beamspace). $s_v(t)$ represents the temporal codes acquired by the sensor nodes in different virtual spatial bins. These temporal codes can be spread spectrum codes or other codes that enable delay resolution as known to those skilled in the art. Using equations (6), (9), and (14), the system equation, ignoring any delay in re-transmission by the sensor nodes, that relates the received signal to the transmitted signal in the beamspace is $$r_V(t) = \sqrt{\frac{\varepsilon}{M}} \sum_{\ell=0}^{L} H_V(\ell) s_V(t - \ell/W) + w_V(t), \quad (18)$$

where $H_v(l)$ represents the virtual spatial matrix corresponding to the $l^{th}$ virtual delay and $w_v(t)$ represents a vector of independent, temporal AWGN processes with a power spectral density of $\sigma^2$. The $m^{th}$ component of $s_v(t)$, $s_v(m; t)$, is a unit-energy pseudo-random waveform with bandwidth W and duration T. In an exemplary embodiment, $s_v(m; t)$ is a direct-sequence spread spectrum waveform. As a result, $$\langle s_V(m; t - \ell/W), s_V(m; t - \ell'/W) \rangle \approx \delta_{\ell-\ell'}. \quad (19)$$

In an operation 56, each $r_v(m; t)$, the $m^{th}$ component of $r_v(t)$, is correlated (matched filtered) with a delayed version of $s_v(m; t)$ yielding the sufficient statistics for data retrieval $$z_{m,\ell} = \langle r_V(m; t), s_V(m; t - \ell/W) \rangle \quad (20)$$

$$\approx \int_0^{T + 2\tau_{max}} \langle r_V(m; t) s_V^*(m, t - \ell/W) dt. \quad (21)$$

In an 58, each matched filtered or correlator output, $z_{m,l}$ f is decoded to yield the sensed datum $\hat{\beta}_1 \ldots \hat{\beta}_K$ from each sensor node, where K is the number of sensor nodes of the plurality of sensor nodes 22. In general, the matched-filter outputs in equation (21) include the desired response from the sensor node in the (m, l)$^{th}$ angle-delay resolution bin as well as interference from sensors in other resolution bins. Such interference is virtually eliminated in the ideal situation when each sensor node is located in the center of an angle-delay resolution bin. This situation results when $(\theta_i, \tau_i) = (m/M, 1/W)$ for some $m \in \{-\tilde{M}, \ldots, \tilde{M}\}$ and $l \in \{0, \ldots, L-1\}$. In this case, using equation (17), $r_v(m; t)$ and $z_{m,l}$ can be simplified to $$r_V(m; t) \approx \sqrt{\frac{\varepsilon}{M}} \sum_{\ell=0}^{L} h_V(m, \ell) s_V\left(m; t - \frac{\ell}{W}\right) + w_V(m; t) \quad (22)$$

$$z_{m,\ell} = \sqrt{M\varepsilon} \beta_{i(m,\varphi)} \gamma_{i(m,\ell)} + w_{m,\ell}, \quad (23)$$

where $w_{m,l}$ are independent and identically distributed (iid) Gaussian with variance $\sigma^2$. The factor $\sqrt{m}$ reflects the M-fold array gain or the beamforming gain in reception associated with an M-element antenna array.

While different spreading codes can be assigned to different spatial sectors, use of the same spread-spectrum waveform, q(t) may be transmitted in all spatial beams in an exemplary embodiment. In such an exemplary embodiment, $s_v(m; t)=q(t)$ for all m. Assuming that there is sufficient angle-delay resolution so that each sensor node lies in a unique angle-delay resolution bin and there are k<ML angle-delay resolution bins occupied by transmitting sensor nodes, the matched filter outputs corresponding to the $i^{th}$ sensor node can be uniquely labeled by the mapping $z(m(i),l(i)) \rightarrow z_i$ for i=1 ..., Kk. The matched filter outputs can be expressed as $$z_i = \sqrt{M\varepsilon}\,\beta_i\tilde{\gamma}_i + \sqrt{M\varepsilon}\sum_{k\neq i}\beta_k\tilde{\gamma}_{k,i} + w_i, \quad (24)$$

where $\sqrt{M\varepsilon}\beta_i\tilde{\gamma}_i$ represents the desired signal component from the $i^{th}$ sensor node, $\beta_k\tilde{\gamma}_{k,i}$, k≠i; represents the interference due to the other K−1 sensor nodes located in other resolution bins, $$\tilde{\gamma}_{k,i} = e^{-j\phi_k} g(\theta - m(i)/M)\mathrm{sinc}(W\tilde{\tau}_k - l(i)), \quad (25)$$

and $\tilde{\gamma}_i = \tilde{\gamma}_{l,i}$. The matched filter outputs, $\{z_i = z_{m(i),l(i)} : i=1,\ldots K\}$, corresponding to the K angle-delay resolution bins occupied by sensor nodes, represent the sufficient statistics for data retrieval at the data retrieval device 24.

Retrieval of independent data streams from sensor nodes is the most challenging data retrieval task from a communication viewpoint due to interference between sensor transmissions. This is particularly true when a large number of sensor nodes are used. Methods for mitigating inter-sensor interference are important for energy-efficient operation. The low-power communication channel from the plurality of sensor nodes 22 to the data retrieval device 24 is a multiple access channel and the different sensors are analogous to multiple users in a communication context simultaneously accessing the channel. Thus, a range of multi-user detection techniques including, but not limited to, code division multiple access, frequency division multiple access, time division multiple access, global system for mobile communications, general packet radio services, carrier sense multiple access (CSMA), CSMA-collision detection (CSMA-CD), orthogonal frequency division multiplexing, Aloha, slotted Aloha, spectrum portable management application, Bluetooth, IEEE 802.11, etc. as known to those skilled in the art both now and in the future can be leveraged in this context.

An interference suppression technique can be implemented based on the idea of linearly constrained minimum variance (LCMV) filtering that exploits the correlation between the interference corrupting the matched filter (MF) output of a desired angle-delay resolution bin and the MF outputs of the remaining active resolution bins to suppress the interference in the desired MF output. To achieve this, K LCMV filters are designed for the active angle-delay resolution bins that jointly operate on all active MF outputs. The filters operate on the MF outputs within each transmission interval. No joint processing is performed across multiple transmissions in time. Assuming $z=[z_1 \ldots z_K]^T$ denotes the vector of MF outputs corresponding to the active angle-delay bins equation (24) takes the form $$z = \Gamma\beta + w \quad (26)$$

where $\Gamma = [\Gamma_{i,j}] = [\tilde{\gamma}_{j,i}]$ is the coupling matrix between the k sensors nodes, $\beta = [\beta_1 \ldots \beta_K]^T$ is the vector of sensor data, and w is a complex AWGN vector with variance $\sigma^2$. The filtered sufficient statistic $\tilde{z}_i$ for the $i^{th}$ sensor node is obtained as $\tilde{z}_i = h^H_{i,opt} z$, and the filter $h_{i,opt}$ is designed to minimize the output power (variance) of $\tilde{z}_i$ subject to a linear constraint that preserves the desired signal from the $i^{th}$ sensor node:

$$h_{i,opt} = \arg\min E(|h^H z|^2)\, s.t.\, h^H \Gamma_i = 1, \quad (27)$$

where $\Gamma_i$ is the $i^{th}$ column of $\Gamma$. An optimum filter is given by $$h_{i,opt} = \frac{R^{-1}\Gamma_i}{\Gamma_i^H R^{-1}\Gamma_i}, \quad (28)$$

where $R = E[zz^H]$ is the correlation matrix of the active MF outputs. In essence, the constrained optimization results in reduction of interference power in the MF output $\tilde{z}_i$, while preserving the desired signal from the $i^{th}$ sensor node.

The computation of LCMV filters can be done in a variety of ways. The data correlation matrix R can be directly estimated by using MF outputs for multiple transmission periods. The estimation of the coupling matrix, $\Gamma$, which defines the constraints, is more challenging. One approach is to make different sensors transmit in disjoint transmission intervals from which different columns of $\Gamma$ can be estimated. Alternatively, finer angle-delay position estimates for the different sensor nodes can be obtained by oversampling the matched filtered outputs in angle and delay. An approximation to the coupling matrix can be obtained via the analytical expressions for $\tilde{\gamma}_{k,i}$.

Figure 4:
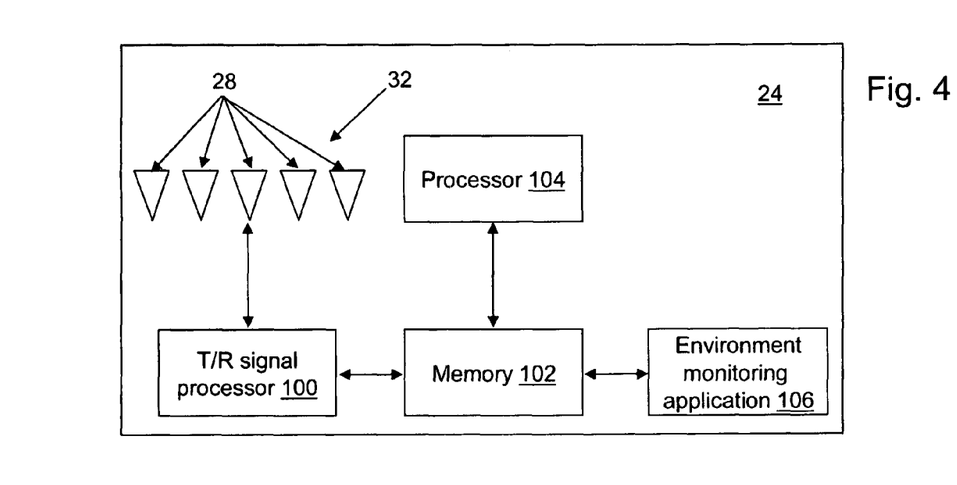
FIG. 4 is a block diagram of the data retrieval device in accordance with an exemplary embodiment.

With reference to FIG. 4, an exemplary data retrieval device 24 is shown. Data retrieval device 24 may include linear array 32, a transmit/receive (T/R) signal processor 100, a memory 102, a processor 104, and an environment monitoring application 106. The output of linear array 32 may be spread-spectrum signals, short broadband pulses or a signal synthesized from multiple discrete frequencies, from a frequency swept (chirp) pulse, etc. T/R signal processor 100 forms the transmitted signals s(t) transmitted from each antenna of the plurality of antenna elements 28. T/R signal processor 100 also performs some or all of the operations described with reference to FIG. 2 to determine $\beta = [\beta_1, \ldots, \beta_K]^T$, the vector of encoded, sensed data from each sensor node of the plurality of sensor nodes 22. Different and additional components may be utilized by data retrieval device 24. For example, data retrieval device 24 includes one or more power source that may be a battery. Data retrieval device 24 may also include, for example, a display to display information related to the environment sensed by the plurality of sensor nodes 22. In an additional embodiment, data retrieval device 24 may include a remote connection to linear array 32.

T/R signal processor 100 includes a signal generator supplied with clock pulses from a clock. The output of the signal generator is provided to a power amplifier, the output of which is provided to a directional coupler. The output of the directional coupler is provided to a switching system, which selectively directs the power leading to each antenna of the plurality of antenna elements. Dedicated power amplifiers for the plurality of antenna elements 28 may also be used.

Memory 102 stores environment monitoring application 106, in addition to other information. Data retrieval device 24 may have one or more memories 102 that uses the same or a different memory technology. Memory technologies include, but are not limited to, random access memory, read only memory, flash memory, etc. In an alternative embodiment, memory 102 may be implemented at a different device.

Processor 104 executes instructions that may be written using one or more programming language, scripting language, assembly language, etc. The instructions may be carried out by a special purpose computer, logic circuits, or hardware circuits. Thus, processor 104 may be implemented in hardware, firmware, software, or any combination of these methods. The term "execution" is the process of running an application or the carrying out of the operation called for by an instruction. Processor 44 executes environment monitoring application 106 and/or other instructions. Data retrieval device 24 may have one or more processors 104 that use the same or a different processing technology. In an alternative embodiment, processor 104 may be implemented at a different device.

Environment monitoring application 106 is an organized set of instructions that, when executed, cause data retrieval device 24 to analyze, display, and/or otherwise process the vector of sensed data. Environment application specifications may also be used by data retrieval device 24 to send additional control signals to the plurality of sensor nodes 22 to define the method of encoding the data sensed at the plurality of sensor nodes. Environment monitoring application 106 may be written using one or more programming language, assembly language, scripting language, etc. In an alternative embodiment, environment monitoring application 106 may be executed and/or stored at a different device.

Figure 5:
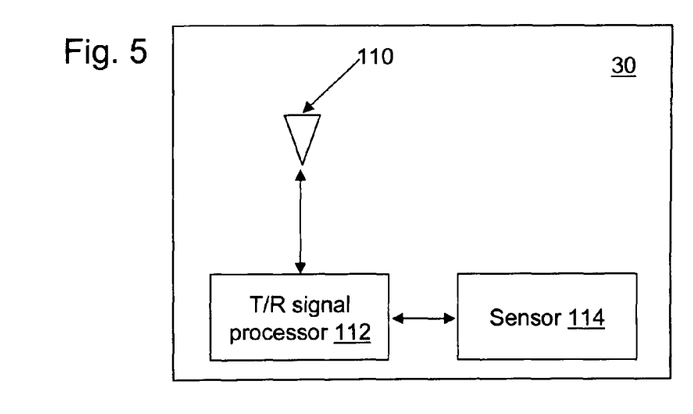
FIG. 5 is a block diagram of an exemplary sensor node in accordance with an exemplary embodiment.

With reference to FIG. 5, an exemplary sensor node 30 is shown. Sensor node 30 may include a transceiver 110, a transmit/receive (T/R) signal processor 112, and a sensor 114. In an exemplary embodiment, sensor 114 provides a characterization of the local environment at sensor node 30. Environmental monitoring may be in any modality made possible by existing or future sensing technology, including RF spectral characterization data, chemical concentration, temperature, sound, weather, and/or atmospheric data, etc. T/R signal processor 112 performs some or all of the operations described with reference to FIG. 3. T/R signal processor 112 processes $x_i(t)$ and forms the signal $y_i(t)$ transmitted from each sensor node of the plurality of sensor nodes 22. Transceiver 110 transmits $y_i(t)$ and receives $x_i(t)$. Different and additional components may be utilized by sensor node 30. For example, sensor node 30 includes one or more power source that may be a battery.

Data retrieval system 20 provides for the flexible retrieval of data from a plurality of sensor nodes 22 with reduced cost, latency, and energy usage. For illustration of possible usage environments of data retrieval system 20, two data retrieval tasks are analyzed. First, a high-rate data retrieval corresponding to distributed, independent sensor measurements is analyzed, and second, a low-rate data retrieval corresponding to localized, correlated measurements is analyzed. Both coherent signal processing and non-coherent signal processing methods at the receiver are considered. In all cases, a binary transmission from the sensor nodes is assumed for the sake of simplicity. The bit-error probability, $P_e$, is determined as a function of the transmit power at each sensor node. In each configuration, the exact position of the sensor nodes is fixed, but unknown. Thus, the $\tilde{\gamma}_i$ and $\tilde{\gamma}_{k,i}$ are fixed but unknown.

For the case of distributed, independent sensor measurements and coherent signal processing, the sensor nodes employ binary phase shift keying (BPSK) modulation, $\{\beta_i \in \{-1, +1\}\}$, and the phases $\{\phi_i\}$ are known (or estimated) at the receiver. For estimation, the phases $\{\phi i\}$ are assumed to be stable for at least two transmission intervals. Each transmission from a sensor node consists of two packets: a training packet for phase estimation at data retrieval device 24 followed by a data packet. Assuming a perfect phase estimate at data retrieval device 24, the phase corrected matched filter output for the $i^{th}$ sensor node is given by $$\tilde{z}_i = e^{j\phi_i} z_i \tag{29}$$

$$= \sqrt{M\varepsilon}\,\beta_i|\tilde{\gamma}_i| + \sqrt{M\varepsilon}\sum_{k \neq i}\beta_k \gamma k, i e^{j\phi_i} + w_i \tag{30}$$

$$= S_i + I_i + w_i, \tag{31}$$

where $S_i$ and $I_i$ represent the signal and interference terms, respectively. Using a Gaussian approximation for the interference $I_i$, the optimal estimate for the $i^{th}$ sensor transmission is $\hat{\beta}_i = \text{sign}\{\text{re}(\tilde{z}_i)\}$. The probability of error, $P_e$, is characterized by the Signal-to-Interference-and-Noise-Ratio (SINR) as $$P_e = Q(\sqrt{SINR}) = Q\left(\sqrt{\frac{2M|\tilde{\gamma}_i|^2 \varepsilon}{\sigma^2 + M\sum_{k \neq i}|\tilde{\gamma}_{k,i}|^2 \varepsilon}}\right), \tag{32}$$

where the signal power $E[|S_i|^2] = M|\tilde{\gamma}_i|^2 \epsilon$, the interference power $E[|I_i|^2] = M\Sigma_{k \neq i}|\tilde{\gamma}_{k,i}|^2 \epsilon$, and $\sigma^2$ denotes the variance of AWGN $w_i$. Without the use of interference suppression techniques, the system is interference limited. As a result, $P_e$ exhibits an error floor at high SINR $$P_e \rightarrow Q\left(\sqrt{\frac{2|\tilde{\gamma}_i|^2}{\sum_{k \neq i}|\tilde{\gamma}_{k,i}|^2}}\right). \tag{33}$$

Equation (33) is a function only of the number of sensor nodes and the sensor node positions. In the ideal case, if the sensor node positions are exactly aligned with the center of the angle-delay resolution bins, then $\tilde{\gamma}hd\ k,i = \delta_{k-i}$. In this case, there is no interference between sensors and $P_e$ is given by $$P_e = Q\sqrt{\frac{2M\varepsilon}{\sigma^2}}. \tag{34}$$

For sensor nodes employing non-coherent signaling, $\beta_i \in \{0, \sqrt{2}\}$, and the $\phi_i$ are assumed unknown at data retrieval device 24. In this case, the matched filter output in equation (24) takes the form $$H_0: z_i = I_i + W_i \tag{35}$$

$$H_1: z_i = S_i + I_i + w_i, \tag{36}$$

where $S_i = \sqrt{2M\epsilon}\beta_i\tilde{\gamma}_i$ and $I_i = \sqrt{2M\epsilon}\Sigma_{k \neq i}\beta_k\tilde{\gamma}_{k,i}$, represent the signal and interference components, respectively. Approximating the interference as Gaussian and using standard techniques, the optimal decision takes the form $$\frac{p(z_i|H_1)}{p(z_i|H_0)} \underset{<}{\overset{>}{\gtrless}} 1 \Rightarrow I_0\left(\frac{2\alpha|z_i|}{\tilde{\sigma}^2}\right) \underset{<}{\overset{>}{\gtrless}} e^{\alpha^2/\tilde{\sigma}^2}, \quad (37)$$

where $\alpha = \sqrt{2M\epsilon}|\tilde{\gamma}_i|$, $\tilde{\sigma}^2 = 2M\Sigma^{k \neq i}|\tilde{\gamma}_{k,i}|^2\epsilon + \sigma^2$, and $I_0$ is the modified Bessel function of type 1 and order 0. Due to monotonicity of $I_0$, the optimum detection rule simplifies to $|z_i| \gtrless \lambda$. The optimal threshold $\lambda$ is a function of $\tilde{\gamma}_i$ and $\tilde{\sigma}^2$, and can be optimized for a particular sensor node set-up. $P_e$ can be characterized by noting that $|z_i|$ is Rayleigh under $H_0$ and Rician $H_1$ as $$P_e = \frac{1}{2}[P_{e,0} + P_{e,1}] \quad (38)$$

$$P_{e,0} = P(|z_i| > \lambda \mid H_0) = e^{-\lambda^2/\tilde{\sigma}^2} \quad (39)$$

$$P_{e,1} = P(|z_i| < \lambda \mid H_1) = F_{\chi_2'^2\left(\frac{2\alpha^2}{\tilde{\sigma}^2}\right)}\left(\frac{2\lambda^2}{\tilde{\sigma}^2}\right), \quad (40)$$

where $F_{\chi_2'^2(x)}(y)$ is the distribution function of a non-central, chi-squared random variable with non-centrality parameter x and 2 degrees of freedom.

In the ideal case, since $\tilde{\gamma}_{ki} = \delta_{k-i}$, $\alpha^2 = 2M\epsilon$, and $\tilde{\sigma}^2 = \sigma^2$, $P_e$ becomes $$P_e = \frac{1}{2}e^{-\lambda^2/\sigma^2} + \frac{1}{2}F_{\chi_2'^2\left(\frac{4M\epsilon}{\sigma^2}\right)}\left(\frac{2\lambda^2}{\sigma^2}\right), \quad (41)$$

which is the $P_e$ for on-off signaling with unknown random phase. The factor M in the non-centrality parameter reflects the array gain.

Figure 6:
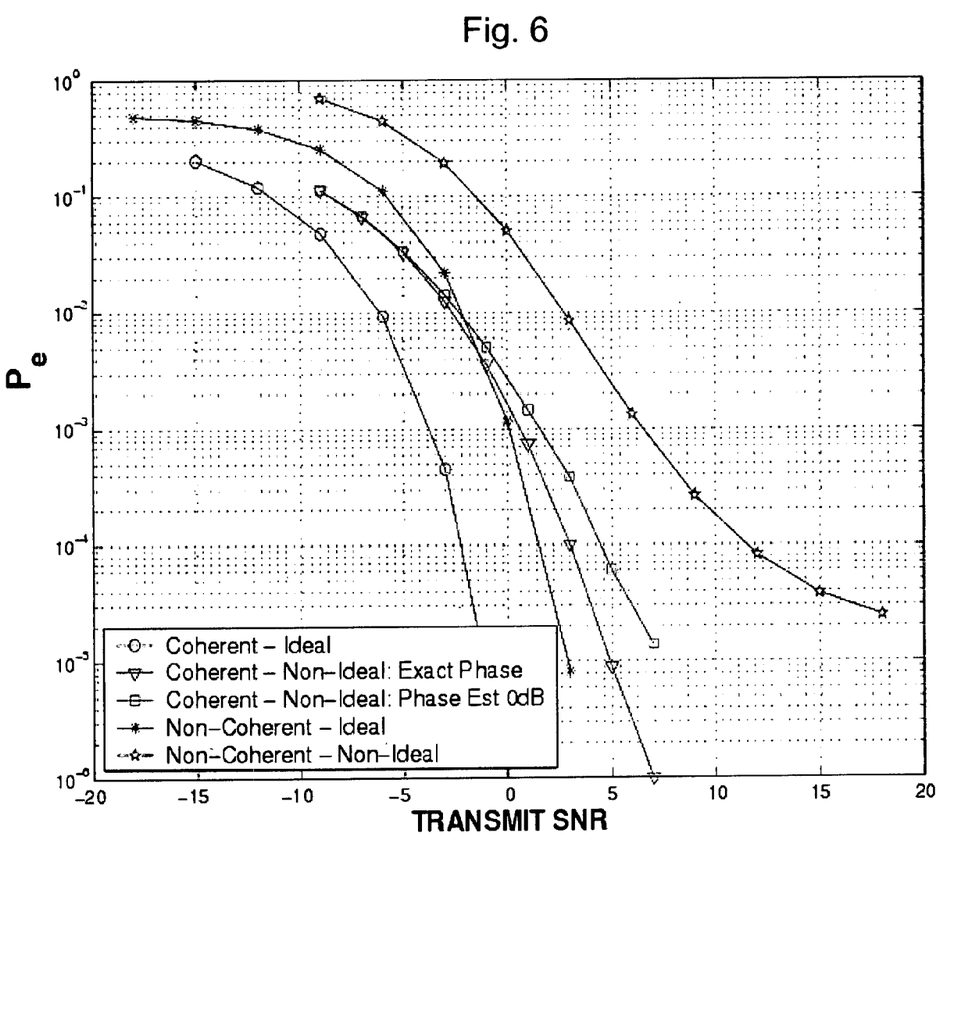
FIG. 6 is a graph illustrating a probability of error as a function of signal-to-noise ration assuming independent transmissions from each sensor node in accordance with an exemplary embodiment.

With reference to FIG. 6, the $P_e$ for independent sensor measurements is shown for both coherent and non-coherent signaling. For coherent signaling, a comparison between ideal coherent processing, non-ideal coherent processing assuming exact phase information, and non-ideal coherent processing assuming phase estimation at 0 dB signal-to-noise ratio (SNR) is shown. For non-coherent signaling, a comparison between ideal non-coherent processing and non-ideal non-coherent processing is shown. The ideal non-coherent and coherent curves represent benchmarks in which the sensor nodes are located at the center of the angle-delay resolution bins to minimize interference. All other $P_e$ plots correspond to a random, but fixed position of the plurality of sensor nodes within their respective angle-delay resolution bin. The $P_e$ curves reflect the average performance across all sensor nodes.

A single spread-spectrum waveform was used for all virtual spatial beams: $s_v(m; t) = q(t)$ for all m, where a length $N = TW = 127$ pseudo-random binary code is used for $q(t)$. For coherent reception, the phases $\{\phi_i\}$ were assumed to remain constant over two transmission intervals. Each sensor node transmits two bits for each information bit: a training bit from which data retrieval device 24 estimates its relative phase followed by the information bit. $M = L = 11$ corresponding to a total of $ML = 121$ angle-delay resolution bins were used. The independent sensor transmissions were from $K = 11$ distinct angle-delay resolution bins. The transmission bits are iid across all sensor nodes as well as across time. Thus, a total of 11 bits were retrieved in each transmission interval. Non-ideal, non-coherent detection incurs a loss in SNR and also exhibits a $P_e$ floor of $\approx 2 \times 10^{-5}$ at approximately 15 dB due to interference. Coherent detection performs quite well even in the presence of interference and assuming a training SNR as low as 0 dB.

Figure 7:
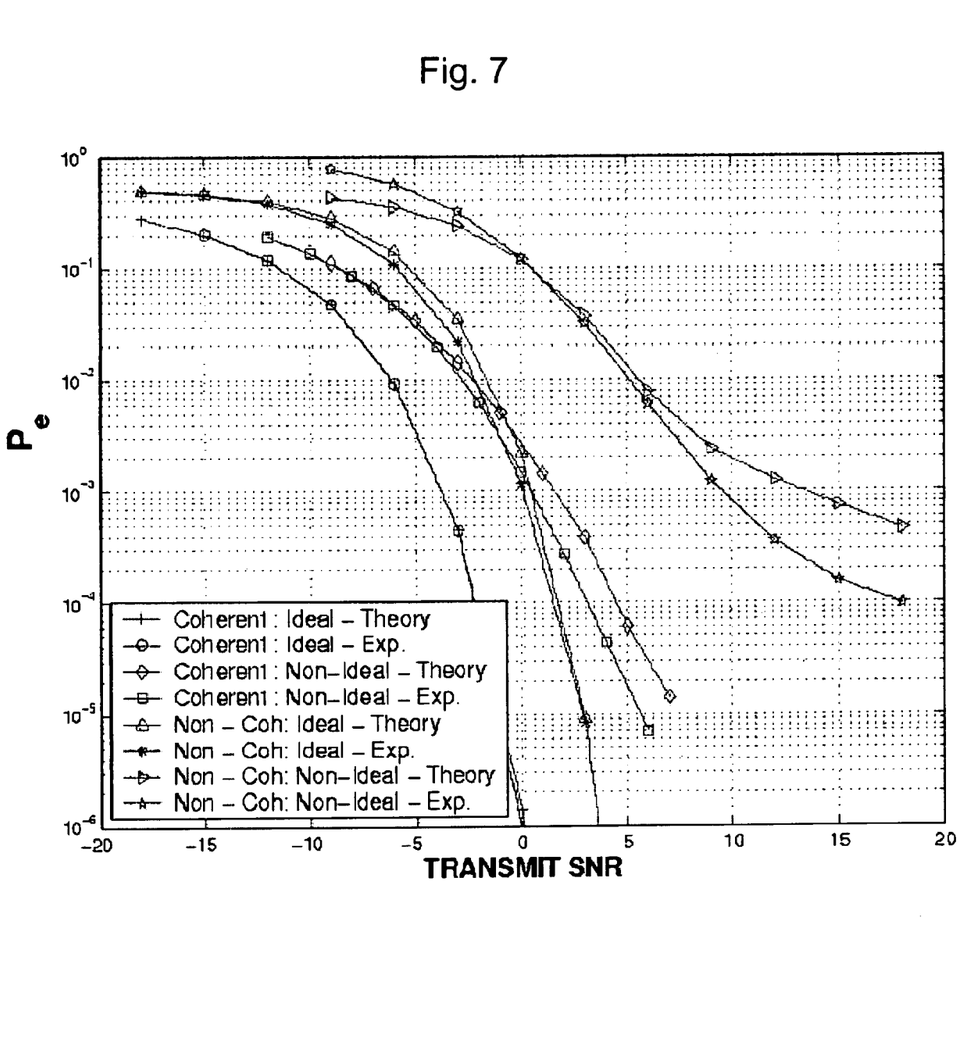
FIG. 7 is a graph comparing the theoretical values of the probability of error with experimentally determined values in a similar set of experiments as in FIG. 6.

With reference to FIG. 7, the experimental $P_e$ curves for a set-up similar to that in FIG. 6 are compared with the analytic expressions obtained in equations (32) and (38)-(40). The agreement is excellent for the ideal coherent and non-coherent curves. The agreement is quite good even for the non-ideal coherent and non-coherent curves. The deviations can be attributed to the Gaussian approximation for interference.

Figure 8:
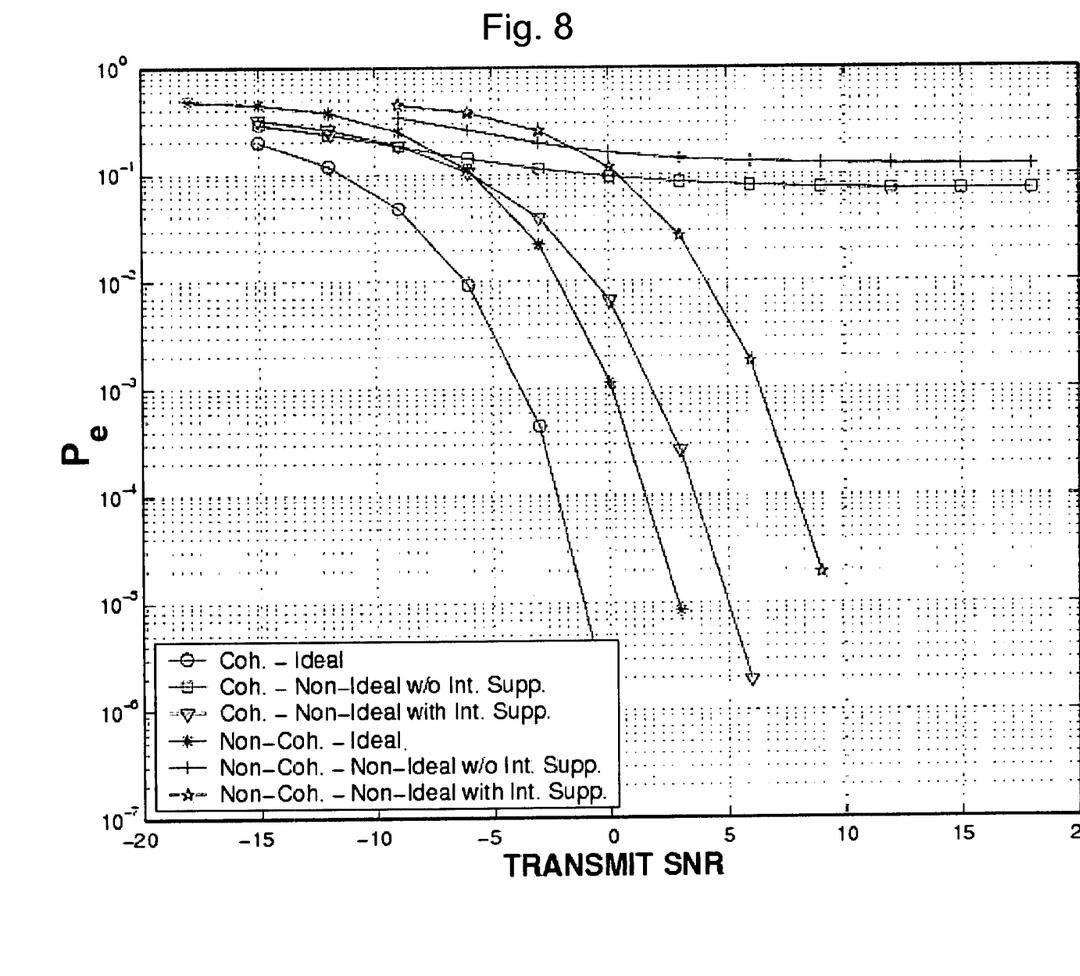
FIG. 8 is a graph illustrating a probability of error as a function of signal-to-noise ratio assuming independent transmissions from each sensor node and use of an interference suppression in accordance with an exemplary embodiment.

With reference to FIG. 8, the $P_e$ for high-rate information retrieval is shown for both coherent and non-coherent signaling with interference suppression when all available angle-delay resolution bins (ML=121) are active, and the sensor nodes send independent bit streams. 121 bits were retrieved in each transmission interval. The $P_e$ for a sensor node near the center of the region 26 (maximum interference) was examined. As indicated in FIG. 8, data retrieval system 20 with interference suppression provides excellent performance and exhibits no error floors in contrast to those encountered using MF-based detection and no interference suppression.

For the case of a single localized event sensed by sensor nodes in multiple adjacent angle-delay resolution bins, the sensor measurements are assumed to be highly correlated (i.e., redundant sensing). As a result, an identical bit stream was assumed to be transmitted from each sensor node, i.e., $\beta_i = \beta$ for all i. The common transmitted bit was assumed to be independent in different transmission intervals.

An optimal decision in this case is based on the sum of phase-corrected MF outputs, $\hat{\beta}_i = \text{sign}\{\text{Re}(\Sigma \tilde{z}_i)\}$ where $$\tilde{z}_i = z_i e^{j\phi_i} = \sqrt{M\epsilon\beta}\left(|\tilde{\gamma}_i| + \sum_{k \neq i} \tilde{\gamma}_{k,i}^{e^{j\phi_i}}\right) + \tilde{w}_i. \quad (42)$$

The corresponding error probability is approximately given by $$P_e = Q\left(\sqrt{\frac{2M\epsilon\left(\sum_i |\tilde{\gamma}_i|^2 + (1/2)\sum_i \sum_{k \neq i} |\tilde{\gamma}_{k,i}|^2\right)}{\alpha^2}}\right). \quad (43)$$

Thus, a K fold increase in SNR as compared to the case of independent transmissions is achieved because, instead of interfering, different sensor nodes contribute to each bit. In the ideal case, the K sensor node transmissions are essentially K parallel AWGN channels transmitting the same data and $$P_e = Q\left(\frac{\sqrt{2MK\epsilon}}{\alpha^2}\right), \quad (44)$$

which is the $P_e$ for a BPSK signaling system transmitting with K times the individual sensor power.

For non-coherent processing, the MF outputs for the K sensor nodes can be simplified to $z_i = \alpha_i + w_i$ where $\alpha_i = \sqrt{2M\epsilon}(\tilde{\gamma}_i + \Sigma_{k \neq i}\tilde{\gamma}_{k,i})$ represents the effective signal strength. Solving the joint detection problem for $\beta$, the optimal decision is $$\hat{\beta} = \text{sign}\left(\sum_i |z_i|^2 - \lambda^2\right) \quad (45)$$

where $\lambda^2$ is the optimal threshold that can be optimized for a given sensor node. configuration. $|z_i|\|H_0$ is approximately Rayleigh($\sigma^2/2$), therefore, $(2/\sigma^2)|z_i|^2|H_0$ is approximately $\chi_2^2$, the standard central chi-squared distribution with two degrees of freedom. Thus, $$P_{e,0} = P\left(\sum_i |z_i|^2 < \lambda^2 \Big| H_o\right) = 1 - F_{2\chi_{2K}^2}\left(\frac{2\lambda^2}{\alpha^2}\right), \quad (46)$$

where $F_{\chi_{2K}^2}(x)$ is the distribution function of a central chi-squared random variable with 2K degrees of freedom. Under $H_1$, $|z_i|\|H_1 \sim \text{Rice}(\alpha_i|^2, \sigma^2/2)$ which results in $$\frac{2}{\sigma^2}\sum_i |z_i|^2 \Big| H_1 \sim {\chi'}_{2k}^2(2\alpha^2/\sigma^2)$$

where $\alpha^2 = \Sigma_i|\alpha_i|^2$. Thus, $P_{e,1} = P(\Sigma_i|z_i|^2 < \lambda^2|H_1$ can be defined in terms of the cdf of the chi-squared distribution. The resulting $P_e$ is $$P_{e,0} = \frac{1}{2}\left[1 - F_{\chi_{2k}^2}\left(\frac{2\lambda^2}{\alpha^2}\right)\right] + \frac{1}{2}F_{2\chi'_{2k}\left(\frac{2\alpha^2}{\sigma^2}\right)}\left(\frac{2\lambda^2}{\alpha^2}\right). \quad (47)$$

Compared to the independent transmissions case, the absence of interference in the K parallel transmissions yields significant performance improvements. In the ideal situation, we have $\alpha 2 = 2KM\epsilon$. Therefore, $$P_{e,0} = \frac{1}{2}\left[1 - F_{\chi_{2k}^2}\left(\frac{2\lambda^2}{\alpha^2}\right)\right] + \frac{1}{2}F_{2\chi'_{2k}\left(\frac{4KM_E}{\alpha^2}\right)}\left(\frac{2\lambda^2}{\alpha^2}\right). \quad (48)$$

Figure 9:
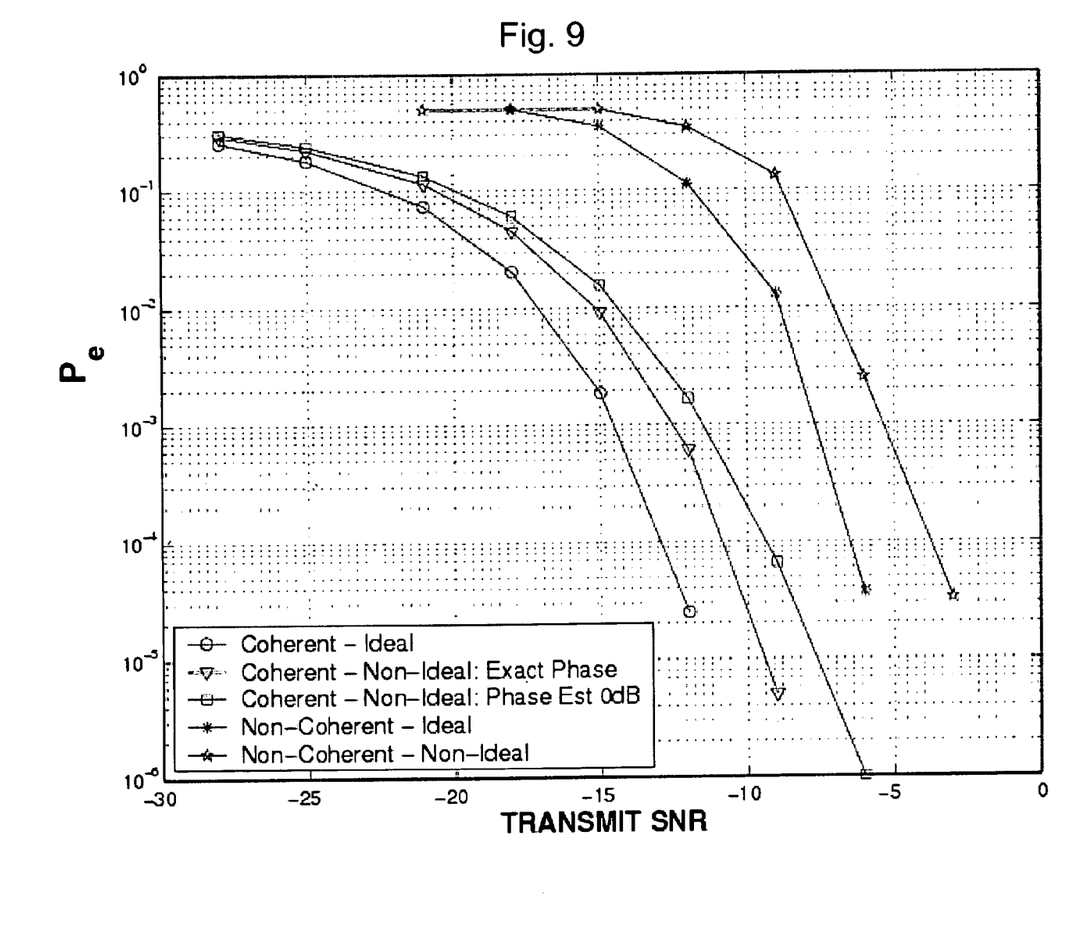
FIG. 9 is a graph illustrating a probability of error as a function of signal-to-noise ratio assuming identical transmissions from each sensor node in accordance with an exemplary embodiment.

With reference to FIG. 9, the $P_e$ for correlated sensor measurements is shown for both coherent and non-coherent signaling. For coherent signaling, a comparison between ideal coherent processing, non-ideal coherent processing assuming exact phase information, and non-ideal coherent processing assuming phase estimation at 0 dB SNR is shown. For non-coherent signaling, a comparison between ideal non-coherent processing and non-ideal non-coherent processing is shown. The ideal non-coherent and coherent curves represent benchmarks in which the sensor nodes are located at the center of the angle-delay resolution bins to minimize interference. All other $P_e$ plots correspond to a random, but fixed position of the plurality of sensor nodes within their respective angle-delay resolution bin. The $P_e$ curves reflect the average performance across all sensor nodes. The sensing configuration corresponding to correlated (redundant) sensing of a localized event represents identical transmissions from K=12 adjacent bins. Thus, a single bit of information was retrieved in each transmission period. As expected, this case exhibits a dramatic improvement in $P_e$ as compared to independent transmissions due to a lack of interference. In fact, a SNR gain proportional to K due to identical transmissions is realized. Non-ideal detectors (both coherent and non-coherent) perform nearly as well as ideal detection (no error floors) and coherent detection shows approximately a 7 dB gain over non-coherent detection.

Data retrieval system 20 exploits MTW signal space dimensions in time, frequency, and space for rapid and energy-efficient information retrieval from a plurality of sensor nodes 22. In effect, a maximum of ML (L<<TW) channels can be established for data retrieval by resolving sensor nodes in angle and delay using angle-delay matched filtering, which also provides a sensor localization map at a resolution commensurate with M and W.

The numerical results illustrate an inherent rate-reliability tradeoff. The rate of data retrieval can be increased by sensing independent distributed events through $N_c$<ML sensing channels, although at the cost of reliability due to interference between sensor transmissions. On the other hand, reliability can be dramatically increased by using all $N_c$ channels for redundant localized sensing at the cost of rate. The use of a low-complexity LCMV technique at the data retrieval device 24 can significantly enhances the capacity and reliability of information retrieval.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired-from practice of the invention. For example, it is not necessary to resolve a single sensor node in each angle-delay resolution bin. In fact, multiple correlated sensor transmissions from within each resolution bin can be exploited for dramatic reduction in power consumption using phase-coherent transmissions. Additionally, the sensor node power consumption can be further reduced by using independently coded transmissions from different sensors. The embodiments were chosen and described in order to explain the principles of the invention and as practical applications of the invention to enable one skilled in the art to utilize the invention in various embodiments and with various modifications as suited to the particular use contemplated. For example, other forms of space-time signals may be employed by the data retrieval device 24 for interrogating and retrieving information from the plurality of sensor nodes 22. It is intended that the scope of the invention be defined by the claims appended hereto and their equivalents.

What is claimed is:

1. A data retrieval device, the data retrieval device comprising:
   a plurality of antennas configured to transmit a first signal toward a plurality of wireless sensor nodes and to receive a second signal from the plurality of wireless sensor nodes, the second signal including a sensed datum, the sensed datum identified at the plurality of wireless sensor nodes; and
   a processor coupled to receive the second signal from the plurality of antennas, the processor defining a virtual receive signal from the received second signal for the plurality of antennas, wherein defining the virtual receive signal comprises defining a discrete Fourier transform matrix whose columns form an orthonormal basis for a spatial signal space, and further wherein the discrete Fourier transform matrix columns are normalized steering vectors for virtual angles corresponding to beamforming in a plurality of virtual directions, and processing the defined virtual receive signal to determine the sensed datum.

2. The data retrieval device of claim 1, further comprising a memory and an application stored in the memory, the application configured to process the determined datum.

3. A method of retrieving data from a plurality of wireless sensor nodes, the method comprising:
  transmitting a first signal from a plurality of antennas toward a plurality of wireless sensor nodes;
  receiving a second signal from the plurality of wireless sensor nodes at the plurality of antennas, the second signal including a sensed datum, the sensed datum identified at the plurality of wireless sensor nodes;
  defining a virtual receive signal from the received second signal for the plurality of antennas, wherein defining the virtual receive signal comprises defining a discrete Fourier transform matrix whose columns form an orthonormal basis for a spatial signal space, and further wherein the discrete Fourier transform matrix columns are normalized steering vectors for virtual angles corresponding to beamforming in a plurality of virtual directions; and
  processing the defined virtual receive signal to determine the sensed datum.

4. The method of claim 3, wherein the first signal is a wideband, space-time signal.

5. The method of claim 3, wherein the second signal is a superposition of signals transmitted from the plurality of wireless sensor nodes.

6. The method of claim 3, wherein the plurality of antennas form a linear array.

7. The method of claim 3, wherein the sensed datum is independent for at least two of the plurality of wireless sensor nodes.

8. The method of claim 3, wherein the sensed datum is correlated for at least two of the plurality of wireless sensor nodes.

9. The method of claim 3, wherein defining the virtual receive signal further comprises defining a virtual spatial matrix from the discrete Fourier transform matrix.

10. The method of claim 9, wherein the virtual spatial matrix partitions the plurality of wireless sensor nodes based on the virtual angles.

11. The method of claim 3, wherein processing the virtual receive signal includes partitioning the plurality of wireless sensor nodes based on a time delay.

12. The method of claim 11, wherein the time delay has a resolution 1/W, where W is the two-sided bandwidth of the transmitted first signal.

13. The method of claim 3, wherein processing the virtual receive signal further comprises correlating the filtered virtual receive signal with a time delayed version of the transmitted first signal.

14. The method of claim 13, wherein processing the virtual receive signal further comprises decoding the correlated virtual receive signal.

15. The method of claim 3, wherein the transmitted first signal includes a spreading code.

16. The method of claim 15, wherein a different spreading code is used to transmit the first signal from at least one of the plurality of antennas.

17. A data retrieval system, the data retrieval system comprising:
  a plurality of wireless sensor nodes, the plurality of wireless sensor nodes including a transceiver receiving a first signal and transmitting a second signal, the second signal including a sensed datum identified at the plurality of wireless sensor nodes; and
  a data retrieval device, the data retrieval device including
  a plurality of antennas transmitting the first signal toward the plurality of wireless sensor nodes and receiving the second signal from the plurality of wireless sensor nodes; and
  a processor coupled to receive the received second signal from the plurality of antennas, the processor defining a virtual receive signal from the received second signal for the plurality of antennas, wherein defining the virtual receive signal comprises defining a discrete Fourier transform matrix whose columns form an orthonormal basis for a spatial signal space, and further wherein the discrete Fourier transform matrix columns are normalized steering vectors for virtual angles corresponding to beamforming in a plurality of virtual directions, and processing the defined virtual receive signal to determine the identified sensed datum.

18. The system of claim 17, wherein a wireless sensor node of the plurality of wireless sensor nodes includes a sensor, the sensor determining the sensed datum.

19. The system of claim 18, wherein the wireless sensor node encodes the determined datum.

20. The system of claim 19, wherein the wireless sensor node modulates the encoded datum onto a spreading code forming the second signal.

21. The system of claim 17, wherein a wireless sensor node of the plurality of wireless sensor nodes transmits the second signal after a time delay.

22. The system of claim 17, wherein a wireless sensor node of the plurality of wireless sensor nodes transmits the second signal instantaneously.

23. The system of claim 17, wherein the receive first signal is a superposition of signals transmitted from the plurality of antennas of the data retrieval device.

24. The data retrieval device of claim 1, wherein defining the virtual receive signal further comprises defining a virtual spatial matrix from the discrete Fourier transform matrix.

25. The data retrieval device of claim 24, wherein the virtual spatial matrix partitions the plurality of wireless sensor nodes based on the virtual angles.

26. The data retrieval device of claim 1, wherein processing the virtual receive signal further comprises correlating the filtered virtual receive signal with a time delayed version of the transmitted first signal.

* * * * *

UNITED STATES PATENT AND TRADEMARK OFFICE
CERTIFICATE OF CORRECTION

PATENT NO. : 7,881,671 B2
APPLICATION NO. : 11/406070
DATED : February 1, 2011
INVENTOR(S) : Akbar M. Sayeed It is certified that error appears in the above-identified patent and that said Letters Patent is hereby corrected as shown below:

IN THE SPECIFICATION:

Col. 4; line 32:

Delete the equation "$a(\theta) = [e^{j2\pi M\theta}, \ldots, 1, \ldots, e^{-j2\pi M\theta}]^T$" and replace with -- $a(\theta) = [e^{j2\pi \tilde{M}\theta}, \ldots, 1, \ldots, e^{-j2\pi \tilde{M}\theta}]^T$ --

Col. 4; line 41:

Delete the equation "$x_i(t) = e^{-j\phi}a^T(\theta_i)s(t - \tau_i)$," and replace with -- $x_i(t) = e^{-j\varphi_i}a^T(\theta_i)s(t - \tau_i)$, --

Col. 5; line 25:

Delete the equation "$r(t) = [r_0(t), r_i(t), \ldots, r_{M-1}(t)]^T$" and replace with -- $r(t) = [r_0(t), r_1(t), \ldots, r_{M-1}(t)]^T$ --

Col. 5; line 53:

Delete the equation "$\alpha_1 = \beta_{ie}^{-j\phi_i}$" and replace with -- $\alpha_i = \beta_{ie}^{-j\phi_i}$ --

Col. 6; line 35:

Delete the equation "$\tilde{\theta}_m = m/M, m = -M, \ldots, \tilde{M}$" and replace with -- $\tilde{\theta}_m = m/M, m = -\bar{M}, \ldots, \bar{M}$ --

Col. 7; line 47-48:

Delete the equation "$S_{\tau,l} = \{i: -\frac{1}{2}W < \tilde{\tau}_i - 1 \leq \frac{1}{2}W\}$" and replace with -- $S_{\tau,\ell} = \{i: -\frac{1}{2}W < \tilde{\tau}_i - \ell/w \leq \frac{1}{2}W\}$ --

Col. 7; line 52-53:
Delete the term "H$_v$(m, m, f)" and replace with --H$_v$(m, m, $\ell$)--

Signed and Sealed this
Twenty-seventh Day of March, 2012

David J. Kappos
*Director of the United States Patent and Trademark Office*

CERTIFICATE OF CORRECTION (continued)
U.S. Pat. No. 7,881,671 B2

IN THE SPECIFICATION:

Col. 8; line 29:

Delete the equation "$\left(s_v(m; t - \ell/W), s_v(m; t - \ell'/W)\right) \approx \delta_{\ell-\ell'}.$" and replace with -- $\left(s_v(m; t - \ell/W), s_v(m; t - \ell'/W)\right) \approx \delta_{\ell-\ell'}.$ --

Col. 8; line 40:

Delete the term "$z_{m,l}$" and replace with -- $z_{m,\ell}$ --

Col. 8; line 50:

Delete the term "$t \in \{0,..., L-1\}$" and replace with -- $\ell \in \{0,..., L-1\}$ --

Col. 8; line 62:

Delete the term "$\sqrt{m}$" and replace with -- $\sqrt{M}$ --

Col. 9; line 22:

Delete the equation "$\tilde{\gamma}_i i = \tilde{\gamma}_{i,i}$" and replace with -- $\tilde{\gamma}_i i = \tilde{\gamma}_{i,i}$ --

Col. 12; line 46:

Delete the equation "$\tilde{\gamma}\text{hd } k, i = \delta_{k-i}$" and replace with -- $\tilde{\gamma}_{k,i} = \delta_{k-i}$ --

Col. 12; line 60:

Delete the equation "$H_0: z_i = l_i + W_i$" and replace with -- $H_0: z_i = l_i + w_i$ --

Col. 14: line 65:

Delete the equation "$\alpha_i = \sqrt{2M\epsilon}(\tilde{\gamma}_i + \sum k \neq 1 \tilde{\gamma}_{k,i})$" and replace with -- $\alpha_i = \sqrt{2m\epsilon}(\tilde{\gamma}_i + \sum k \neq 1 \tilde{\gamma}_{k,i})$ --

Col. 15; line 41:

Delete the equation "$\alpha 2 = 2KM\in$" and replace with -- $\alpha^2 = 2KM\epsilon$ --

Col. 15; line 45:

Delete the equation "$P_{e,0} = \frac{1}{2}\left[1 - F_{x'^2_{2k}}\left(\frac{2\lambda^2}{\alpha^2}\right)\right] + \frac{1}{2}F_{x'^2_{2k}}\left(\frac{4KM\epsilon}{\alpha^2}\right)\left(\frac{2\lambda^2}{\alpha^2}\right)$" and replace with -- $P_{e,0} = \frac{1}{2}\left[1 - F_{x^2_{2k}}\left(\frac{2\lambda^2}{\alpha^2}\right)\right] + \frac{1}{2}F_{x'^2_{2k}}\left(\frac{4KM\epsilon}{\alpha^2}\right)\left(\frac{2\lambda^2}{\alpha^2}\right)$ --